(12) United States Patent
Suzuki et al.

(10) Patent No.: US 9,967,873 B2
(45) Date of Patent: May 8, 2018

(54) MOBILE STATION DEVICE, RADIO COMMUNICATION METHOD AND INTEGRATED CIRCUIT

(71) Applicant: SHARP KABUSHIKI KAISHA, Sakai, Osaka (JP)

(72) Inventors: Shoichi Suzuki, Osaka (JP); Tatsushi Aiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days. days.

(21) Appl. No.: 15/587,854

(22) Filed: May 5, 2017

(65) Prior Publication Data

US 2017/0245249 A1    Aug. 24, 2017

Related U.S. Application Data

(63) Continuation of application No. 15/069,013, filed on Mar. 14, 2016, now Pat. No. 9,681,435, which is a
(Continued)

(30) Foreign Application Priority Data

Oct. 29, 2010    (JP) ................................. 2010-243768

(51) Int. Cl.
*H04W 72/00*    (2009.01)
*H04W 72/04*    (2009.01)
(Continued)

(52) U.S. Cl.
CPC ......... *H04W 72/042* (2013.01); *H04L 1/1816* (2013.01); *H04L 1/1896* (2013.01); *H04L 5/0055* (2013.01); *H04W 72/0446* (2013.01)

(58) Field of Classification Search
None
See application file for complete search history.

(56) References Cited

U.S. PATENT DOCUMENTS 6,374,078 B1    4/2002    Williams et al.
9,320,031 B2 *  4/2016    Suzuki ............... H04W 72/042
(Continued)

FOREIGN PATENT DOCUMENTS

JP    2010-502096 A    1/2010
JP    2011-211494 A    10/2011
(Continued)

OTHER PUBLICATIONS

Ericsson, ST Ericsson, "Introduction of UL spatial multiplexing in MAC", 3GPP TSG RAN WG2 Meeting #71bis, R2-105464, Oct. 11-15, 2010, pp. 1-8.
(Continued)

*Primary Examiner* — Chi H Pham
*Assistant Examiner* — Shick Hom
(74) *Attorney, Agent, or Firm* — Birch, Stewart, Kolasch & Birch, LLP

(57) ABSTRACT

A mobile station device transmits a transport block in an uplink subframe. The mobile station device delivers acknowledgement (ACK) for the transport block to higher layers in a case that the transport block was transmitted by the mobile station device to a base station device and the transport block is disabled based on a physical downlink control channel received in a downlink subframe.

3 Claims, 7 Drawing Sheets

Related U.S. Application Data continuation of application No. 13/881,794, filed as application No. PCT/JP2011/074528 on Oct. 25, 2011, now Pat. No. 9,320,031.

(51) Int. Cl.
*H04L 5/00* (2006.01)
*H04L 1/18* (2006.01)

(56) References Cited

U.S. PATENT DOCUMENTS

| | | | |
|---|---|---|---|
| 9,681,435 B2* | 6/2017 | Suzuki | H04L 1/1829 |
| 2002/0093928 A1 | 7/2002 | LoGalbo et al. | |
| 2004/0224697 A1 | 11/2004 | Hakkinen et al. | |
| 2005/0176437 A1 | 8/2005 | Mir | |
| 2009/0241004 A1 | 9/2009 | Ahn et al. | |
| 2009/0257408 A1 | 10/2009 | Zhang et al. | |
| 2010/0074211 A1 | 3/2010 | Kim et al. | |
| 2010/0091672 A1 | 4/2010 | Ishii | |
| 2010/0157916 A1 | 6/2010 | Kim et al. | |
| 2010/0223524 A1 | 9/2010 | Duggan et al. | |
| 2010/0235705 A1 | 9/2010 | Kim et al. | |
| 2011/0013536 A1 | 1/2011 | Falahati et al. | |
| 2011/0035639 A1 | 2/2011 | Earnshaw et al. | |
| 2011/0096693 A1* | 4/2011 | Astely | H04L 1/1635 370/252 |
| 2011/0103247 A1 | 5/2011 | Chen et al. | |
| 2011/0126068 A1* | 5/2011 | Lee | H04L 1/1607 714/748 |
| 2011/0176502 A1 | 7/2011 | Chung et al. | |
| 2011/0294491 A1* | 12/2011 | Fong | H04L 5/001 455/422.1 |
| 2013/0051269 A1 | 2/2013 | Suzuki et al. | |
| 2013/0051341 A1 | 2/2013 | Suzuki et al. | |
| 2013/0336256 A1 | 12/2013 | Chung et al. | |

FOREIGN PATENT DOCUMENTS

| | | |
|---|---|---|
| JP | 2011-211495 A | 10/2011 |
| JP | 2011-223127 A | 11/2011 |
| TW | 201004209 A | 1/2010 |
| TW | 201004212 A | 1/2010 |
| WO | WO 2008/105422 A1 | 9/2008 |
| WO | WO 2009/129897 A1 | 10/2009 |
| WO | WO 2010/011083 A2 | 1/2010 |

OTHER PUBLICATIONS

Huawei, "Control signaling design for UL MIMO," 3GPP TSG RAN WG1 meeting #62, Madrid, Spain, Aug. 23-27, 2010 (server date Aug. 18, 2010, downloaded by EPO on Oct. 3, 2010), 6 pages, R1-104507, XP50450103.
Huawei, "Control Signalling Design for UL MIMO", 3GPP TSG RAN WG1 Meeting #61bis, Dresden, Germany, Jun. 28-Jul. 2, 2010, R1-103893, 5 pages.
Motorola, "UL SU-MIMO precoding in PHICH-triggered non-adaptive retransmissions," 3GPP TSG RAN WG1 Meeting #61bis, Dresden, Germany, Jun. 28-Jul. 2, 2010 (server date Jun. 22, 2010, downloaded by EPO on Oct. 3, 2010), 3 pages, R1-103915, XP50449300.
Nokia Siemens Networks, Nokia, "UL SU-MIMO transmission modes and control signalling", 3GPP TSG RAN WG1 Meeting #62bis, R1-105535, Oct. 11-15, 2010, pp. 1-6.
NTT DOCOMO, "Investigation of Layer Shifting and HARQ Spatial Bundling for UL SU-MIMO", 3GPP TSG RAN WG1 Meeting #60, R1-101655, Feb. 22-26, 2010, pp. 1-5.
Advisory Action for copending U.S. Appl. No. 13/881,794, dated Feb. 9, 2015.
Final Office Action for copending U.S. Appl. No. 13/881,794, dated Aug. 6, 2015.
Final Office Action for copending U.S. Appl. No. 13/881,794, dated Oct. 24, 2014.
Non-Final Office Action for copending U.S. Appl. No. 13/881,794, dated Jul. 11, 2014.
Non-Final Office Action for copending U.S. Appl. No. 13/881,794, dated Mar. 23, 2015.
Non-Final Office Action for U.S. Appl. No. 15/069,013, dated Jul. 28, 2016.
Notice of Allowance for U.S. Appl. No. 15/069,013, dated Feb. 10, 2017.
Texas Instruments: "Remaining Issues on UL MIMO Transmission Mode and DCI Format Design", 3GPP Draft; R1-105287, Oct. 5, 2010.

* cited by examiner

FIG.2

| RESOURCE BLOCK ALLOCATION | x bit |
|---|---|
| TPC COMMAND FOR SCHEDULED PUSCH | 2 bit |
| CYCLIC SHIFT FOR DM-RS AND OCC INDEX | 3 bit |
| CQI REQUEST | 1 bit |
| MULTI CLUSTER FLAG | 1 bit |
| MCS & RV FOR TB1 | 5 bit |
| NDI FOR TB1 | 1 bit |
| MCS & RV FOR TB2 | 5 bit |
| NDI FOR TB2 | 1 bit |
| PRECODING INFORMATION | y bit |

MOBILE STATION DEVICE, RADIO COMMUNICATION METHOD AND INTEGRATED CIRCUIT

CROSS REFERENCE TO RELATED APPLICATIONS

This application is a Continuation Application of U.S. application Ser. No. 15/069,013 filed on Mar. 14, 2016, (now U.S. Pat. No. 9,681,435) which is a Continuation Application of U.S. application Ser. No. 13/881,794 filed on Apr. 26, 2013, now U.S. Pat. No. 9,320,031, which is the National Phase of PCT/JP2011/074528 filed on Oct. 25, 2011, which claims priority under 35 U.S.C 119(a) to Patent Application No. 2010-243768 filed in Japan on Oct. 29, 2010, all of which are hereby expressly incorporated by reference into the present application.

TECHNICAL FIELD

The present invention relates to a mobile station device, a radio communication method and an integrated circuit.

BACKGROUND ART

Evolution of the radio access scheme and the radio network for cellular mobile communication (hereinafter referred to as "Long Term Evolution (LTE)" or "Evolved Universal Terrestrial Radio Access (EUTRA)") has been studied by the 3rd Generation Partnership Project (3GPP). According to LTE, as a communication scheme for radio communication from a base station device to a mobile station device (downlink), the Orthogonal Frequency Division Multiplexing (OFDM) scheme which is a multicarrier transmission scheme is used. Also according to LTE, as a communication scheme for radio communication from a mobile station device to a base station device (uplink), the SC-FDMA (Single-Carrier Frequency Division Multiple Access) scheme which is a single-carrier transmission scheme is used.

According to LTE, HARQ (Hybrid Automatic Repeat reQuest) is used, by which the data failed to be decoded on the receiving side is not discarded but combined with retransmitted data and then decoded. The base station device uses an uplink grant (UL grant) transmitted on a PDCCH (Physical Downlink Control Channel) and an HARQ indicator transmitted on a PHICH (Physical HARQ Indicator Channel), to instruct the mobile station device to perform initial transmission or retransmission of a PUSCH (Physical Uplink Shared Channel) that is a channel for transmitting uplink data (or referred to as an "uplink shared channel (UL-SCH)" or a "transport block").

The base station device receives the PUSCH transmitted by the mobile station device. The base station device transmits, on a PHICH (Physical HARQ Indicator Channel), the HARQ indicator indicating whether uplink data has been successfully decoded or not. The HARQ indicator indicates ACK (ACKnowledgement) or NACK (Negative ACKnowledgement). When the base station device succeeds in decoding uplink data, the HARQ indicator indicates ACK. When the base station device fails to decode uplink data, the HARQ indicator indicates NACK. When the HARQ indicator received on the PHICH indicates NACK or when retransmission of the PUSCH is instructed by an uplink grant, the mobile station device retransmits the PUSCH. The base station device can set the maximum number of times of transmitting uplink data for the mobile station device. When the number of times of transmitting uplink data reaches the maximum number of times of transmission, the mobile station device deletes the uplink data from the HARQ buffer.

The 3GPP has also studied a radio access scheme and a radio network that use a plurality of transmission/reception antennas in a frequency band wider than LTE and an uplink to implement still faster data communication (hereinafter referred to as "Long Term Evolution-Advanced (LTE-A)" or "Advanced Evolved Universal Terrestrial Radio Access (A-EUTRA)"). LTE-A requires backward compatibility with LTE. In other words, LTE-A requires that a base station device of LTE-A should communicate by radio with both a mobile station device of LTE-A and a mobile station device of LTE simultaneously, and that a mobile station device of LTE-A should be able to communicate by radio with both the base station device of LTE-A and the base station device of LTE. Also, LTE-A has studied use of the same channel structure as that of LTE.

According to LTE-A, use of MIMO (Multiple Input Multiple Output) SM (Spatial Multiplexing) for the PUSCH has been studied in order to improve the use efficiency of an uplink frequency. By using MIMO SM, the mobile station device can spatially multiplex a plurality of uplink data into one PUSCH and transmit the data. Non Patent Document 1 discloses that HARQ is performed independently for each of the plurality of uplink data transmitted on the same PUSCH. In order to perform HARQ independently for each of the plurality of uplink data transmitted on the same PUSCH, the base station device transmits an HARQ indicator for each uplink data, and transmits the same uplink grant including the information related to HARQ that indicates initial transmission or retransmission for each uplink data. Non Patent Document 2 proposes to perform an independent HARQ process for each of the plurality of uplink data spatially multiplexed into the same PUSCH, when MIMO SM is used for an uplink.

Non Patent Document 3 proposes that the information included in an uplink grant (UL grant) that can give an instruction to transmit a plurality of uplink grants on the same PUSCH is set at specific code points (values), thereby disabling a part of the uplink data. When a part of the uplink data is disabled by the base station device, the mobile station device transmits, on the PUSCH, uplink data that has not been disabled in accordance with the received uplink grant.

CITATION LIST

Non Patent Document

NPD 1: "Investigation of Layer Shifting and HARQ Spatial Bundling for UL SU-MIMO", 3GPP TSG RAN WG1 Meeting #60, R1-101655, Feb. 22-26, 2010.

NPD 2: "Introduction of UL spatial multiplexing in MAC", 3GPP TSG RAN WG2 Meeting #71bis, R2-105464, Oct. 11-15, 2010.

NPD 3: "UL SU-MIMO transmission modes and control signalling", 3GPP TSG RAN WG1 Meeting #62bis, R1-105535, Oct. 11-15, 2010.

SUMMARY OF INVENTION

Technical Problem

However, according to the conventional technology, it is unclear in what way the mobile station device operates when this mobile station device receives an uplink grant that disables a part of uplink data. If it is unclear in what way the mobile station device operates by the uplink grant and the HARQ indicator that have been transmitted by the base station device, there exists a problem that correct HARQ cannot be performed between the base station device and the mobile station device.

The present invention has been made in light of the above-described problems. An object of the present invention is to apply a mobile station device, a radio communication method and an integrated circuit that allow HARQ to be efficiently performed when an uplink grant disabling a part of uplink data is received by the mobile station device capable of transmitting up to a predetermined number of transport blocks to a base station device on a single physical uplink shared channel.

Solution to Problem (1) According to an aspect of the present invention, a mobile station device is capable of transmitting up to a predetermined number of transport blocks to a base station device on a single physical uplink shared channel. The mobile station device is configured to receive downlink control information transmitted by the base station device and used for scheduling the physical uplink shared channel. The mobile station device is configured to set ACK for an HARQ process corresponding to a specific transport block of the transport blocks in case that the downlink control information indicates that the specific transport block is disabled.

(2) According to another aspect of the present invention, a mobile station device is capable of transmitting up to a predetermined number of transport blocks to a base station device on a single physical uplink shared channel. The mobile station device is configured to receive response information indicating ACK or NACK for the transport block and downlink control information used for scheduling the physical uplink shared channel, which are transmitted by the base station device. The mobile station device is configured to set ACK for an HARQ process corresponding to a specific transport block of the transport blocks in case that the response information indicates NACK for the specific transport block and the downlink control information indicates that the specific transport block is disabled.

(3) Preferably, in case that the downlink control information is a format indicating only transmission of a single transport block of the transport blocks on the physical uplink shared channel, the mobile station device disables one or more transport blocks other than the single transport block.

(4) Preferably, in case that the downlink control information is a format that can indicate transmission of up to the predetermined number of transport blocks on the physical uplink shared channel, the mobile station device disables any of the transport blocks determined based on values of specific fields within the downlink control information.

(5) Preferably, the predetermined number is 2.

(6) Preferably, the specific field includes a field to which information about a modulation and coding scheme for the transport block is mapped.

(7) Preferably, the specific field includes a field to which information indicating initial transmission or retransmission for the transport block is mapped.

(8) According to still another aspect of the present invention, a radio communication method is used for a mobile station device capable of transmitting up to a predetermined number of transport blocks to a base station device on a single physical uplink shared channel. The radio communication method includes the steps of: receiving, by the mobile station device, downlink control information transmitted by the base station device and used for scheduling the physical uplink shared channel; and setting, by the mobile station device, ACK for an HARQ process corresponding to a specific transport block of the transport blocks in case that the downlink control information indicates that the specific transport block is disabled.

(9) According to still another aspect of the present invention, a radio communication method is used for a mobile station device capable of transmitting up to a predetermined number of transport blocks to a base station device on a single physical uplink shared channel. The radio communication method includes the steps of: receiving, by the mobile station device, response information indicating ACK or NACK for the transport block and downlink control information used for scheduling the physical uplink shared channel, which are transmitted by the base station device; and setting, by the mobile station device, ACK for an HARQ process corresponding to a specific transport block of the transport blocks in case that the response information indicates NACK for the specific transport block and the downlink control information indicates that the specific transport block is disabled.

(10) According to still another aspect of the present invention, an integrated circuit is used for a mobile station device capable of transmitting up to a predetermined number of transport blocks to a base station device on a single physical uplink shared channel. The integrated circuit has a function of receiving downlink control information transmitted by the base station device and used for scheduling the physical uplink shared channel; and a function of setting ACK for an HARQ process corresponding to a specific transport block of the transport blocks in case that the downlink control information indicates that the specific transport block is disabled.

(11) According to still another aspect of the present invention, an integrated circuit is used for a mobile station device capable of transmitting up to a predetermined number of transport blocks to a base station device on a single physical uplink shared channel. The integrated circuit has a function of receiving response information indicating ACK or NACK for the transport block and downlink control information used for scheduling the physical uplink shared channel, which are transmitted by the base station device; and a function of setting ACK for an HARQ process corresponding to a specific transport block of the transport blocks in case that the response information indicates NACK for the specific transport block and the downlink control information indicates that the specific transport block is disabled.

Advantageous Effects of Invention

According to the present invention, in a mobile station device transmitting a plurality of uplink data to a base station device using the same PUSCH, an HARQ can be efficiently performed when the mobile station device receives an uplink grant that disables a part of uplink data.

BRIEF DESCRIPTION OF DRAWINGS

FIG. 2 is a diagram illustrating an example of the information mapped to each field within a DCI format 4 according to the present invention.

DESCRIPTION OF EMBODIMENTS

The embodiments of the present invention will be hereinafter described in detail with reference to the drawings.

Figure 1:
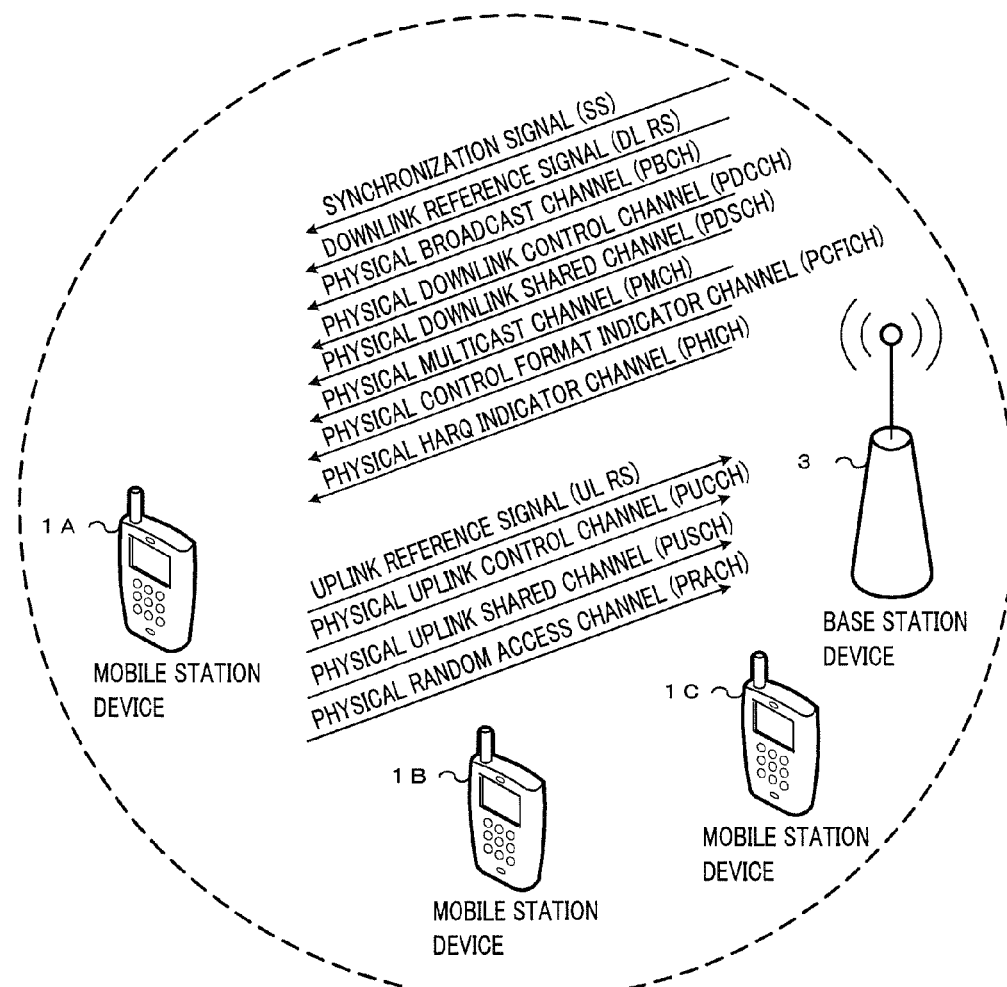
FIG. 1 is a conceptual diagram of a radio communication system according to the present invention.

FIG. 1 is a conceptual diagram of a radio communication system according to the present invention. Referring to FIG. 1, the radio communication system includes mobile station devices 1A to 1C and a base station device 3. FIG. 1 illustrates radio communication from base station device 3 to mobile station devices 1A to 1C (downlink) for which a synchronization signal (SS), a downlink reference signal (DL RS), a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH) are allocated.

FIG. 1 also illustrates radio communication from mobile station devices 1A to 1C to base station device 3 (uplink) for which an uplink reference signal (UL RS), a physical uplink control channel (PUCCH), a physical uplink shared channel (PUSCH), and a physical random access channel (PRACH) are allocated. Mobile station devices 1A, 1B and 1C will be hereinafter collectively referred to as a "mobile station device 1".

The range in which base station device 3 and mobile station device 1 can communicate with each other using the above-described channels and signals will be referred to as a "cell". Base station device 3 may also form a plurality of cells by dividing into pieces the range in which it can communicate with mobile station device 1 using the above-described channels and signals. Furthermore, base station device 3 may form a plurality of cells by dividing a band in a frequency domain into pieces.

The synchronization signal is used by mobile station device 1 for acquiring synchronization in the frequency domain and the time domain in the downlink. The downlink reference signal is used (i) by mobile station device 1 for acquiring synchronization in the frequency domain and the time domain in the downlink; (ii) by mobile station device 1 for measuring the downlink reception quality; and (iii) by mobile station device 1 for compensating PDSCH and PDCCH propagation paths. A PBCH is a physical channel used for broadcasting a control parameter (system information) (broadcast channel: BCH) used in common by mobile station device 1. The PBCH is transmitted at intervals of 40 ms. The timing of 40-ms intervals is blind-detected in mobile station device 1.

The PDCCH is a physical channel used for transmitting downlink control information (DCI) such as a downlink assignment (or also referred to as a "downlink grant") and an uplink grant. The downlink assignment includes information about a modulation scheme and a coding rate for the PDSCH (Modulation and Coding Scheme: MCS), information indicating radio resource allocation, and the like. The uplink grant includes information about a modulation scheme and a coding rate for the PUSCH, information indicating radio resource allocation, and the like.

A plurality of formats are used for downlink control information. The format for the downlink control information is referred to as a "DCI format". For example, as DCI formats for uplink grants, DCI format 0 used in the case where mobile station device 1 transmits the PUSCH using one transmission antenna port, and DCI format 4 used in the case where mobile station device 1 transmits a plurality of uplink data using MIMO SM (Multiple Input Multiple Output Spatial Multiplexing) for the PUSCH are prepared. In the present embodiment, although two uplink data are spatially multiplexed into a single (one) PUSCH, more than two uplink data may be spatially multiplexed. Mobile station device 1 monitors DCI format 0 and DCI format 4 simultaneously for the PDCCH. When detecting DCI format 0, mobile station device 1 transmits the PUSCH using one transmission antenna port. When detecting DCI format 4, mobile station device 1 transmits the PUSCH using a plurality of transmission antenna ports (MIMO SM).

"MIMO SM" is a technology by which a plurality of signals are multiplexed and transmitted/received for multiple spatial dimensions' channels that are implemented by a plurality of transmission antenna ports and a plurality of reception antenna ports. The "antenna port" used herein means a logical antenna used for signal processing. One antenna port may be formed of one physical antenna, or may be formed of a plurality of physical antennas. The device on the transmitting side using MIMO SM performs a process for forming an appropriate spatial channel for a plurality of signals (which will be referred to as precoding). The device on the transmitting side transmits the plurality of signals subjected to a precoding process using a plurality of transmission antennas. The device on the receiving side using MIMO SM performs a process for appropriately demultiplexing the signal multiplexed on the spatial dimension's channels for the plurality of signals received using a plurality of reception antennas.

The PDSCH is a physical channel used for transmitting paging information (paging channel: PCH), and system information that are not broadcasted on the PBCH (that is, other than BCH) and downlink data (Downlink Shared Channel: DL-SCH). The PMCH is a physical channel used for transmitting the information (Multicast Channel: MCH) about MBMS (Multimedia Broadcast and Multicast Service). The PCFICH is a physical channel used for transmitting the information indicating a region to which the PDCCH is mapped. The PHICH is a physical channel used for transmitting an HARQ indicator indicating whether one uplink data received by base station device 3 has been successfully decoded or not. When receiving a plurality of spatially-multiplexed uplink data on the same PUSCH, base station device 3 transmits the PHICH for each of the received uplink data to mobile station device 1.

When base station device 3 successfully decodes uplink data included in the PUSCH, the HARQ indicator indicates ACK (ACKnowledgement). When base station device 3 fails to decode uplink data included in the PUSCH, the HARQ indicator indicates NACK (Negative ACKnowledgement).

The uplink reference signal is used (i) by base station device 3 for acquiring synchronization in the uplink time domain; (ii) by base station device 3 for measuring the uplink reception quality; and (iii) by base station device 3 for compensating PUSCH and PUCCH propagation paths. For the uplink reference signal, code-multiplexing is used and a plurality of different codes are used. For example, a predetermined base sequences is cyclically shifted (which will be referred to as cyclic shift), thereby generating a plurality of codes. In this case, a plurality of different codes are generated by a different shift amount of cyclic shift.

The PUCCH is a physical channel used for transmitting uplink control information (UCI) that is information used for controlling communication, such as channel quality information indicating downlink channel quality, a scheduling request (SR) indicating a request for uplink radio resource allocation, and ACK/NACK indicating whether downlink data received by mobile station device 1 has been successfully decoded or not.

The PUSCH is a physical channel used for transmitting uplink data and uplink control information. The PRACH is a physical channel used for transmitting a random access preamble. The PRACH is used by mobile station device 1 for establishing time-domain synchronization with base station device 3 as the main goal. In addition to this, the PRACH is used for initial access, handover, a reconnection request, and a request for uplink radio resource allocation.

Uplink data (UL-SCH), downlink data (DL-SCH) and the like are transport channels. The unit by which uplink data is transmitted on the PUSCH and the unit by which downlink data is transmitted on the PDSCH each are referred to as a "transport block". The transport block is a unit handled in a MAC (Media Access Control) layer. HARQ (retransmission) is controlled for each transport block. Furthermore, the unit of the data handled in the MAC layer, such as uplink data (UL-SCH) and downlink data (DL-SCH), is also referred to as a "MAC PDU (protocol data unit)". The MAC PDU consists of a plurality of MAC SDUs (service data unit).

In the physical layer, a transport block is associated with a codeword. Also in the physical layer, signal processing such as coding is performed for each codeword. A transport block size shows the bit number of the transport block. Mobile station device 1 recognizes a transport block size based on the number of physical resource blocks (PRB) indicated by the information indicating radio resource allocation and also MCS (MCS & RV) included in the uplink grant and the downlink assignment.

The information included in DCI format 4 (uplink grant) in the present embodiment will be hereinafter described.

FIG. 2 is a diagram illustrating an example of the information mapped to each field within DCI format 4 according to the present invention. The fields shown in FIG. 2 are mapped to the information bit sequentially starting from the field listed at the top in FIG. 2. Resource block assignment is information indicating physical resource blocks (PRB) allocated to the PUSCH. The bit number (×bit) is calculated from the number of physical resource blocks used for uplink communication within a cell.

A TPC (transmission power control) command for scheduled PUSCH is a parameter for controlling transmission power for the PUSCH. Cyclic shift for DM-RS and OCC index is a parameter for calculating the amount of cyclic shift and an orthogonal cover code (OCC) used for the uplink reference signal transmitted together with the PUSCH. A CQI request is information requesting mobile station device 1 to transmit downlink channel quality information on any one of the PUSCHs in a subframe used for transmitting a PUSCH for which radio resource (physical resource block) allocation is indicated by the uplink grant.

A multi cluster flag is information for switching the method of indicating physical resource block allocation by resource block assignment. Depending on the value set at the multi cluster flag, the resource block assignment indicates allocation of continuous physical resource blocks or allocation of discontinuous physical resource blocks in the frequency domain.

An MCS & RV (modulation and coding scheme and redundancy version) and an NDI (New Data indicator) are prepared for each uplink data spatially multiplexed on the PUSCH for which radio resource allocation is indicated by this uplink grant. In FIG. 2, an MCS & RV and an NDI are prepared for each of the first transport block and the second transport block (the first HARQ process and the second HARQ process). The MCS & RV is information indicating a modulation and coding scheme and a redundancy version for uplink data. The NDI is information indicating initial transmission or retransmission of uplink data. Precoding information is information indicating precoding used for a signal transmitted on the PUSCH for which radio resource allocation is indicated by this uplink grant.

Based on whether the NDI is toggled or not, mobile station device 1 identifies whether initial transmission or retransmission on PUSCH is instructed by base station device 3. When receiving the uplink grant, mobile station device 1 stores the NDI included in the received uplink grant. In this case, when mobile station device 1 has already stored the NDI, mobile station device 1 determines whether the NDI has been toggled or not, and then, overwrites a new NDI. "The NDI has been toggled" means that the value of the already stored NDI is different from the value of the received NDI. "The NDI has not been toggled" means that the value of the already stored NDI is the same as the value of the received NDI.

When the NDI has been toggled, mobile station device 1 assumes that this uplink grant instructs initial transmission of a transport block. When the NDI has not been toggled, mobile station device 1 determines that this uplink grant instructs retransmission of a transport block. "The NDI has been toggled" will be hereinafter described as that "downlink control information or an uplink grant instructs initial transmission". "The NDI has not been toggled" will be hereinafter described as that "downlink control information or an uplink grant instructs retransmission".

The method of adding a CRC (Cyclic Redundancy Check) to a DCI format in the present embodiment will be hereinafter described.

A 16-bit CRC parity bit calculated from a payload of the DCI format is attached to the payload of the DCI format. The CRC parity bit attached to the payload of the DCI format is scrambled with 16-bit RNTI (Radio Network Temporary Identity). The DCI format to which the CRC parity bit is attached is coded and modulated, and then, transmitted on the PDCCH.

The RNTI is used for (i) identifying the type of the DCI format; (ii) identifying a use of the DCI format; or (iii) identifying mobile station device 1 allocated with a radio resource by the information for allocating radio resource of a PDSCH or PUSCH included in the DCI format. Mobile station device 1 identifies the type of the DCI format and/or the use of the DCI format depending on which RNTI is used for scrambling the CRC parity bit attached to the uplink grant or downlink assignment in the same DCI format.

For example, the CRC parity bit added to the uplink grant for allocating the PUSCH resource by a predetermined number of times (for example, once) is scrambled with the C-RNTI (Cell-Radio Network Temporary Identity). Base station device 3 sets C-RNTI for each mobile station device 1.

The HARQ process according to the present embodiment will be hereinafter described.

Figure 3:
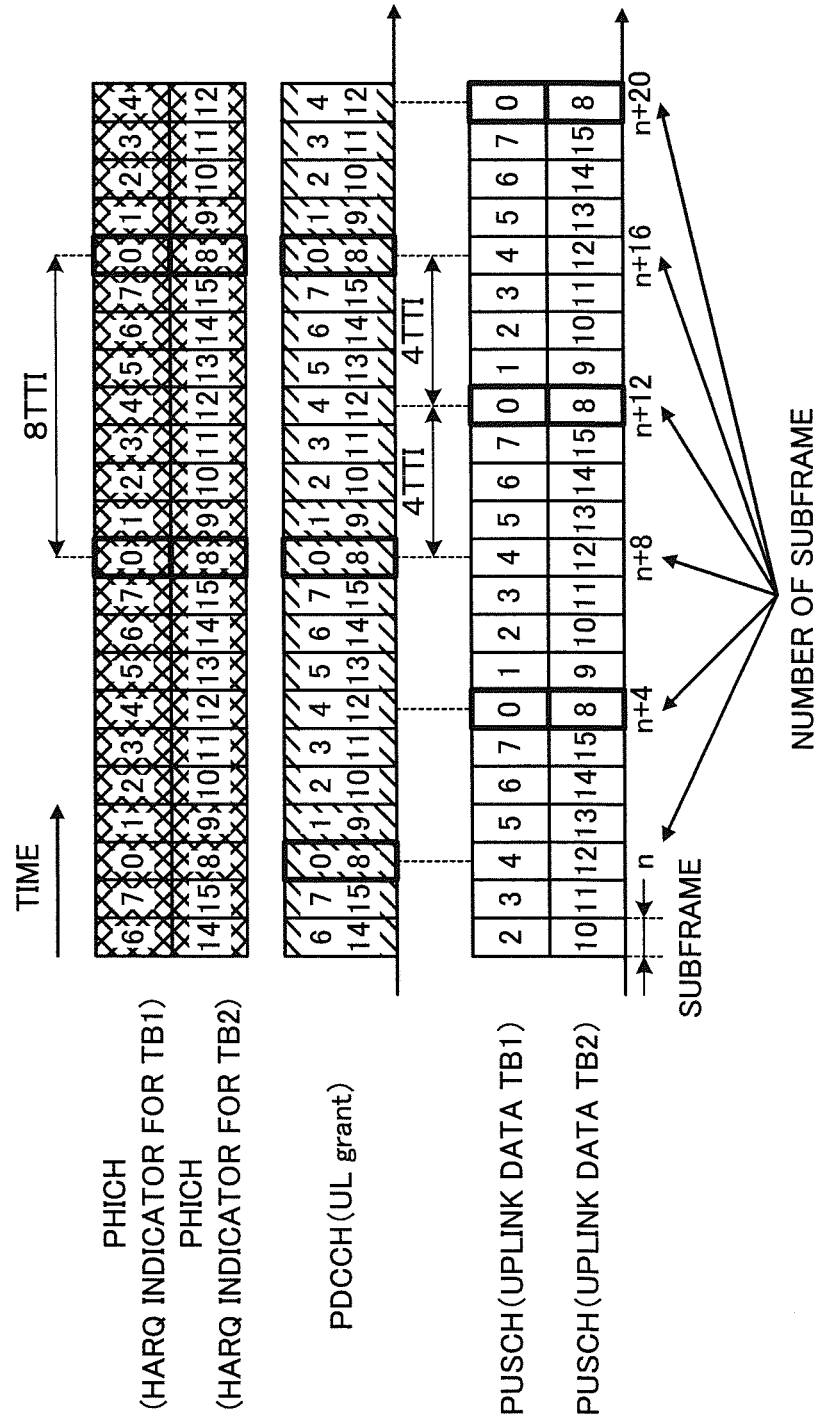
FIG. 3 is a schematic diagram for illustrating an uplink HARQ process according to the present invention.

FIG. 3 is a schematic diagram for illustrating an uplink HARQ process according to the present embodiment. Referring to FIG. 3, the horizontal axis in FIG. 3 shows a time domain. A rectangle hatched in a lattice pattern shows a PHICH. A rectangle hatched by rising diagonal lines from bottom left to top right shows a PDCCH (uplink grant). A rectangle that is not hatched shows a PUSCH (uplink data). The numbers 0 to 15 attached to PHICH, PDCCH and PUSCH each indicate the number of the HARQ process corresponding to each physical channel. In the present embodiment, a plurality of (specifically, 16) HARQ processes run independently at the same time.

The number of the HARQ process corresponding to the PUSCH is associated with the number of the uplink subframe. In FIG. 3, two HARQ processes (the HARQ process corresponding to the first transport block and the HARQ process corresponding to the second transport block) are associated for each one subframe. The first transport block corresponding to DCI format 4 relates to the zeroth to seventh HARQ processes. The second transport block corresponding to DCI format 4 relates to the eighth to fifteenth HARQ processes. The HARQ process related to the first transport block will be hereinafter referred to as the "first HARQ process". The HARQ process related to the second transport block will be hereinafter referred to as "the second HARQ process". It is to be noted that DCI format 0 corresponds only to the first HARQ process. In other words, DCI format 0 is used only for controlling the first transport block, but cannot be used for controlling the second transport block.

The number of the HARQ process corresponding to each of PHICH and PDCCH (uplink grant) is associated with the number of the downlink subframe. In one subframe, a maximum of two PHICHs (the PHICH for the first transport block and the PHICH for the second transport block) are transmitted. In one subframe, DCI format 0 for the first transport block and DCI format 4 for the first transport block and the second transport block are not simultaneously transmitted.

In the uplink and the downlink, the corresponding HARQ process numbers each are shifted by four. Furthermore, the PHICH, the PDCCH (uplink grant) and the PUSCH for the same HARQ process are transmitted at intervals of 8 ms (8 subframes, 8TTI (transmission time interval)).

Each HARQ process is associated with one buffer (which will be hereinafter referred to as an HARQ buffer). Mobile station device 1 stores the uplink data transmitted on the PUSCH in the HARQ buffer for the HARQ process corresponding to this PUSCH. Mobile station device 1 stores the last received uplink grant on the corresponding PDCCH. Base station device 3 stores the uplink data, which has been received on the PUSCH and decoded, in the HARQ buffer for the HARQ process corresponding to this PUSCH. Base station device 3 stores the last transmitted uplink grant on the corresponding PDCCH.

For example, in FIG. 3, mobile station device 1 receives the PDCCH (uplink grant) that instructs initial transmission related to the zeroth and eighth HARQ processes in the n-th downlink subframe. Mobile station device 1 performs initial transmission of the PUSCH related to the zeroth and eighth HARQ processes in the n+fourth uplink subframe in accordance with this PDCCH (uplink grant). Mobile station device 1 receives the PHICH related to the zeroth HARQ process and the PHICH related to the eighth HARQ process and/or the PDCCH (uplink grant) in the n+eighth downlink subframe. Mobile station device 1 controls transmission of the PUSCH related to the zeroth and/or eighth HARQ process(es) in the n+twelfth uplink subframe in accordance with the PHICHs or the PDCCH (uplink grant).

When receiving one uplink grant that instructs spatial multiplexing of two uplink data on the same PUSCH, mobile station device 1 according to the present embodiment regards that it has received two uplink grants for each uplink data that is to be spatially multiplexed. In other words, when receiving one uplink grant corresponding to a plurality of uplink data, mobile station device 1 assumes that it has received an uplink grant for each uplink data. Then, mobile station device 1 performs an independent HARQ process for each uplink data.

Figure 4:
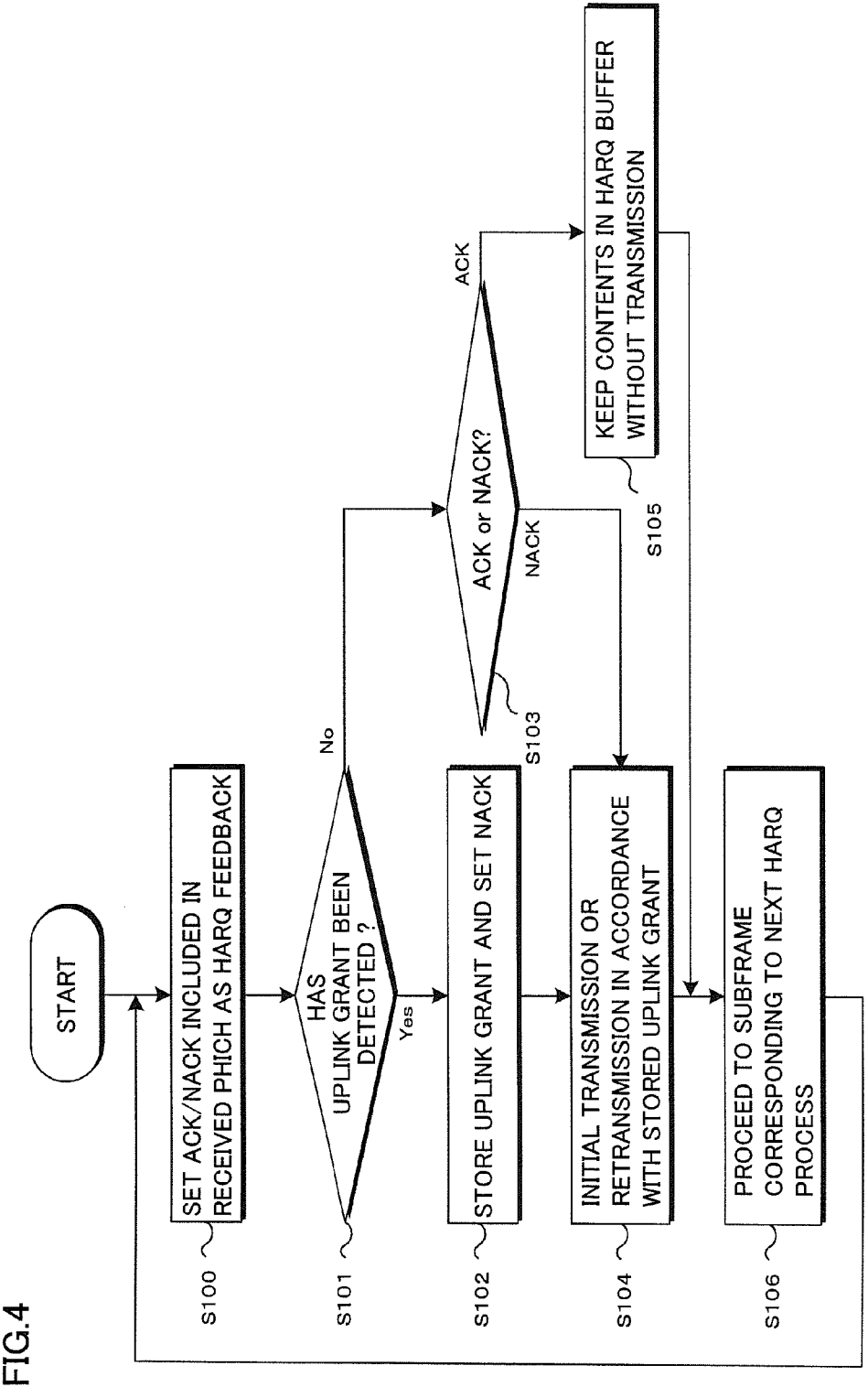
FIG. 4 is a flowchart illustrating the operation of the HARQ process according to the present invention.

FIG. 4 is a flowchart illustrating the operation of the HARQ process according to the present embodiment. Mobile station device 1 performs processing in FIG. 4 for each HARQ process. Referring to FIG. 4, when the HARQ process is started, mobile station device 1 receives a PHICH corresponding to the HARQ process, and sets the ACK or NACK indicated by the HARQ indicator included in the received PHICH as HARQ feedback (step S100). Then, mobile station device 1 determines whether an uplink grant addressed to the mobile station device itself has been detected or not (step S101). When determining that the uplink grant has been detected (YES in step S101), mobile station device 1 stores the detected uplink grant, and sets NACK as HARQ feedback (step S102). After step S102, mobile station device 1 performs initial transmission or retransmission of uplink data on the PUSCH in accordance with the stored uplink grant (step S104).

When the detected uplink grant instructs initial transmission of uplink data, mobile station device 1 determines new uplink data to be transmitted on the PUSCH without depending on the ACK or NACK set as HARQ feedback. Mobile station device 1 stores the determined uplink data in the HARQ buffer, and performs initial transmission of uplink data on the PUSCH in accordance with the detected uplink grant.

When the detected uplink grant instructs retransmission of uplink data, mobile station device 1 retransmits the uplink data stored in the HARQ buffer on the PUSCH in accordance with the detected uplink grant, without depending on the ACK or NACK set as HARQ feedback. When the HARQ buffer is empty, mobile station device 1 determines new uplink data to be transmitted on the PUSCH without depending on whether the detected uplink grant instructs initial transmission or retransmission. Mobile station device 1 stores the determined uplink data in the HARQ buffer, and performs initial transmission of the PUSCH in accordance with the detected uplink grant.

When it is determined in step S101 that the uplink grant has not been detected, mobile station device 1 determines whether ACK or NACK is set as HARQ feedback (step S103). When it is determined in step S103 that NACK is set as HARQ feedback and the HARQ buffer is not empty, mobile station device 1 retransmits the uplink data stored in the HARQ buffer on the PUSCH in accordance with the stored uplink grant (step S104). When it is determined in step S103 that ACK is set as HARQ feedback or the HARQ buffer is empty, mobile station device 1 keeps the contents in the HARQ buffer corresponding to the HARQ process without transmitting the PUSCH (step S105).

After steps S104 and S105, mobile station device 1 returns to step S100 in the next downlink subframe corresponding to this HARQ process (step S106) and receives the PHICH for the HARQ process. In addition, in the cases where the HARQ buffer related to the HARQ process is empty, where the HARQ process has never been used for communication with base station device 3 since mobile station device 1 was turned on, where ACK is set as HARQ feedback, and the like, mobile station device 1 does not receive the PHICH corresponding to this HARQ process in step S100. In addition, in the case where mobile station device 1 receives the uplink grant instructing retransmission after it keeps the contents in the HARQ buffer in step S105, this mobile station device 1 can retransmit the kept contents of the HARQ buffer on the PUSCH.

Mobile station device 1 detects the uplink grant instructing retransmission of uplink data and retransmits uplink data in accordance with the uplink grant detected by this mobile station device 1, which will be referred to as "adaptive HARQ". Mobile station device 1 does not detect the uplink grant, NACK is set as HARQ feedback, and mobile station device 1 retransmits uplink data in accordance with the already stored uplink grant, which will be referred to as "non-adaptive HARQ". In addition, in the present embodiment, the mobile station device does not allow initial transmission and non-adaptive HARQ to simultaneously occur in the single subframe. Furthermore, the mobile station device does not allow adaptive HARQ and non-adaptive HARQ to simultaneously occur in the single subframe.

By setting the specific information of DCI format 4 corresponding to the MIMO SM at specific code points (values), base station device 3 according to the present embodiment can instruct mobile station device 1 not to transmit uplink data corresponding to DCI format 4 (to disable uplink data transmission). In the present embodiment, when uplink data transmission is disabled, base station device 3 toggles the NDI and sets the value of MCS & RV at '29' for uplink data for which an instruction to disable uplink data transmission is given, which are included in DCI format 4. The NDI for certain uplink data is toggled and the value of MCS & RV is set at '29', which will be hereinafter described as that "disabling of uplink data transmission is instructed".

Mobile station device 1 detects DCI format 4 (downlink control information) for controlling more than one uplink data transmission using one PUSCH. When the detected DCI format 4 instructs disabling of uplink data transmission, mobile station device 1 sets ACK in the HARQ process corresponding to this uplink data transmission without transmitting uplink data in the HARQ process for which disabling of uplink data transmission is instructed. Furthermore, mobile station device 1 keeps, in the HARQ buffer, the uplink data for which DCI format 4 instructs disabling of uplink data transmission.

For example, when the detected DCI format 4 instructs disabling of uplink data transmission by the first HARQ process and does not instruct disabling of uplink data transmission by the second HARQ process, mobile station device 1 (i) transmits uplink data by the second HARQ process without transmitting uplink data by the first HARQ process on the PUSCH for which radio resource allocation is indicated by DCI format 4; (ii) sets ACK in the first HARQ process; (iii) sets NACK in the second HARQ process; and (iv) keeps the contents in the HARQ buffer corresponding to the first HARQ and the HARQ buffer corresponding to the second HARQ.

Mobile station device 1 detects DCI format 4 (downlink control information) that controls more than one uplink data transmission using one PUSCH. When the detected DCI format 4 instructs disabling of uplink data transmission and when mobile station device 1 receives the NACK (response information that requests retransmission) for said uplink data for which disabling of uplink data transmission is instructed, mobile station device 1 disables uplink data transmission.

For example, when ACK is indicated by the HARQ indicator for the uplink data for which DCI format 4 instructs disabling of uplink data transmission, mobile station device 1 does not transmit uplink data, but sets ACK in the corresponding HARQ process, and keeps the contents in the HARQ buffer. When NACK is indicated by the HARQ indicator for the uplink data for which DCI format 4 instructs disabling of uplink data transmission, mobile station device 1 does not transmit this uplink data, but sets ACK in the corresponding HARQ process and keeps the contents in the HARQ buffer. In other words, the uplink data for which DCI format 4 instructs disabling of uplink data transmission does not allow retransmission by non-adaptive HARQ even if the HARQ indicator indicates NACK. In other words, the mobile station device does not allow both non-adaptive HARQ and adaptive HARQ or initial transmission to simultaneously occur in a single subframe.

Mobile station device 1 detects DCI format 4 (the first downlink control information) for controlling the first and second uplink data transmission (HARQ process) using a single PUSCH. When DCI format 4 instructs disabling of the second uplink data transmission, mobile station device 1 disables this second uplink data transmission and keeps the second uplink data in the HARQ buffer of the HARQ process corresponding to the second uplink data. When mobile station device 1 detects DCI format 4 (the second control information) instructing retransmission of the second uplink data after it detects DCI format 4 (the first downlink control information) instructing disabling of the second uplink data transmission, this mobile station device 1 retransmits the second uplink data (adaptive HARQ) in accordance with DCI format 4 (the second control information) instructing retransmission of the second uplink data.

In other word, when mobile station device 1 detects the uplink grant that instructs retransmission of uplink data for which disabling of uplink data transmission is instructed, this mobile station device 1 can resume uplink data transmission by adaptive HARQ in accordance with the detected uplink grant. In addition, when disabling of uplink data transmission is instructed, mobile station device 1 does not receive the PHICH for uplink data that has not been transmitted. Accordingly, mobile station device 1 cannot resume, by non-adaptive HARQ, transmission of uplink data for which disabling of uplink data transmission is instructed.

When the number of uplink data controlled by the last received DCI format in a certain HARQ process (a DCI format stored in the HARQ process) (for example, a DCI format 0) is different from the number of uplink data controlled by the next received DCI format (for example, DCI format 4), mobile station device 1 performs initial transmission of uplink data even if the received DCI format (for example, DCI format 4) instructs retransmission of uplink data.

For example, when mobile station device 1 detects a DCI format 0 (the third downlink control information) controlling only the first uplink data transmission (first HARQ process) using a single (one) PUSCH, this mobile station device 1 transmits the first uplink data by the first HARQ process and disables uplink data transmission by the second HARQ process (the second uplink data transmission). Furthermore, when mobile station device 1 detects DCI format 4 that instructs initial transmission or retransmission for the second HARQ process in the subframe after detection of DCI format 0 for the first HARQ process, even if uplink data is stored in the HARQ buffer of the second HARQ process, mobile station device 1 (i) obtains new uplink data; (ii) stores the obtained uplink data in the HARQ process; (iii) performs initial transmission of new uplink data in accordance with the detected DCI format 4; and (iv) sets NACK in the HARQ process.

In other words, when uplink data is stored in the HARQ buffer for each of the first HARQ process and the second HARQ process, and also when mobile station device 1 detects DCI format 0 for the first HARQ process, this mobile station device 1 performs uplink data transmission by the first HARQ based on DCI format 0, and sets ACK for the first HARQ process. In this case, mobile station device 1 does not receive a PHICH for the second HARQ process. Accordingly, after detection of DCI format 0, mobile station device 1 cannot resume uplink data transmission by the second HARQ process by using non-adaptive HARQ.

Furthermore, in this case, mobile station device 1 may flush the HARQ buffer for the second HARQ process, may delete the stored uplink grant, or may set ACK. After detecting DCI format 0 (the third downlink control information) controlling only the first uplink data transmission, mobile station device 1 detects DCI format 4 (the fourth downlink control information). When the detected DCI format 4 (the fourth downlink control information) instructs initial transmission or retransmission for the second HARQ process, mobile station device 1 performs initial transmission of newly obtained uplink data (the third uplink data) without transmitting the second uplink data held in the HARQ buffer for the second HARQ process.

Figure 5:
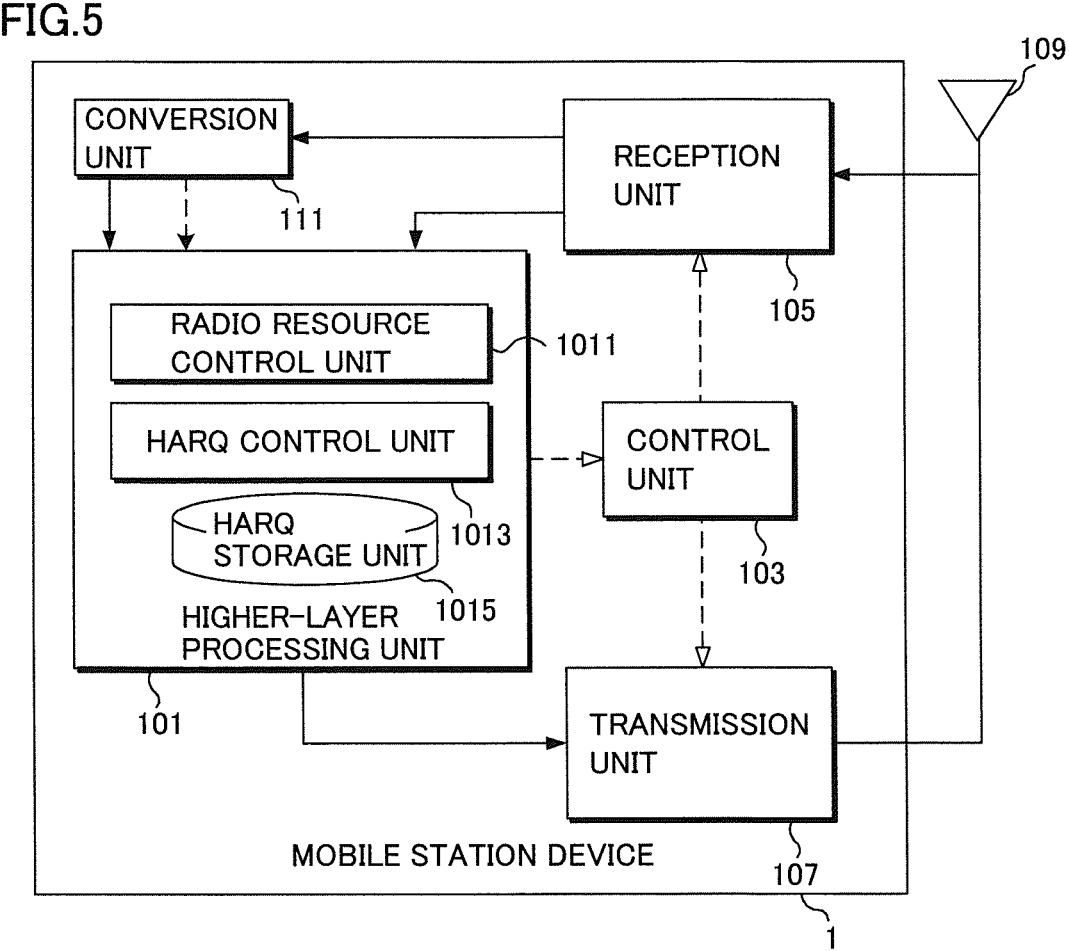
FIG. 5 is a schematic block diagram showing the configuration of a mobile station device according to the present invention.
Figure 6:
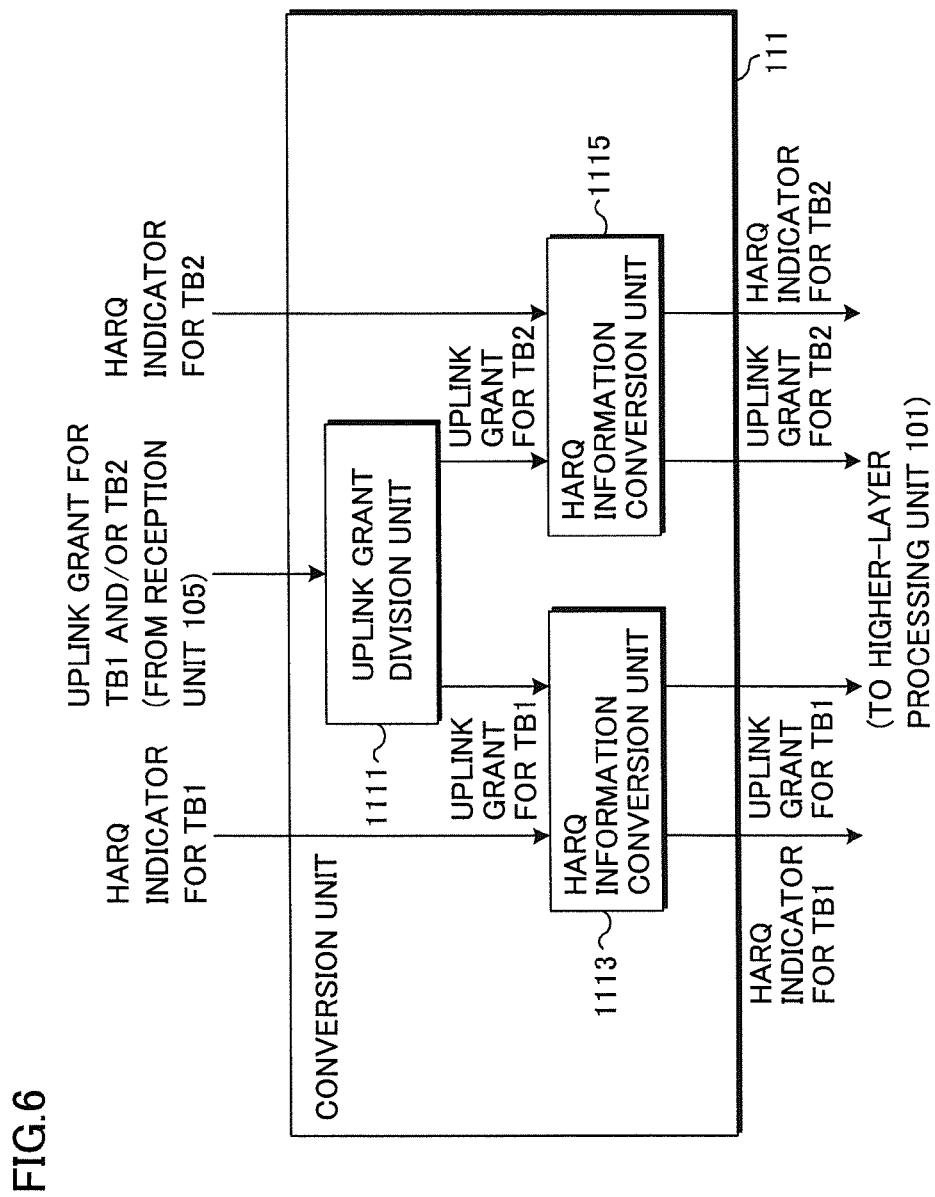
FIG. 6 is a schematic block diagram showing the configuration of a conversion unit according to the present invention.

FIG. 5 is a schematic block diagram showing the configuration of mobile station device 1 according to the present invention. Referring to FIG. 5, mobile station device 1 is configured to include a higher-layer processing unit 101, a control unit 103, a reception unit 105, a transmission unit 107, a transmission/reception antenna 109, and a conversion unit 111. Higher-layer processing unit 101 is configured to include a radio resource control unit 1011, an HARQ control unit 1013, and an HARQ storage unit 1015. FIG. 6 is a schematic block diagram showing the configuration of conversion unit 111 according to the present invention. Referring to FIG. 6, conversion unit 111 is configured to include an uplink grant division unit 1111, an HARQ information conversion unit 1113 corresponding to the first HARQ process, and an HARQ information conversion unit 1115 corresponding to the second HARQ process.

Higher-layer processing unit 101 outputs uplink data generated by the user's operation and the like to a transmission unit 207. Furthermore, higher-layer processing unit 101 performs processing with a medium access control (MAC) layer, a packet data convergence protocol (PDCP) layer, a radio link control (RLC) layer, and a radio resource control (RRC) layer. Furthermore, based on the downlink control information and the like received on the PDCCH, higher-layer processing unit 101 generates control information for controlling reception unit 105 and transmission unit 107. Higher-layer processing unit 101 outputs the generated control information to control unit 103. Radio resource control unit 1011 included in higher-layer processing unit 101 manages a variety of setting information for the mobile station device itself. For example, radio resource control unit 1011 manages RNTI such as C-RNTI. Furthermore, radio resource control unit 1011 generates information mapped to each uplink channel. Radio resource control unit 1011 outputs the generated information to transmission unit 107.

HARQ control unit 1013 included in higher-layer processing unit 101 manages the uplink HARQ processes. HARQ storage unit 1015 included in higher-layer processing unit 101 has an HARQ buffer related to each uplink HARQ process managed by HARQ control unit 1013. HARQ storage unit 1015 stores the uplink grant and the HARQ feedback (ACK or NACK) related to each HARQ process. Since the downlink HARQ processes do not relate to the present embodiment, the description thereof will not be given.

HARQ control unit 1013 performs the following operation for each HARQ process. HARQ control unit 1013 inputs the uplink data transmitted on the PUSCH into the HARQ buffer. HARQ control unit 1013 causes HARQ storage unit 1015 to store ACK or NACK indicated by the HARQ indicator received on the PHICH input from conversion unit 111, and to store the uplink grant received on the PDCCH. HARQ control unit 1013 controls HARQ in accordance with the flowchart in FIG. 4 based on the ACK or NACK and uplink grant stored in HARQ storage unit 1015.

HARQ control unit 1013 associates the number (timing) of the uplink subframe in which the PUSCH is transmitted, with the HARQ process. Based on allocation of the physical resource blocks for PUSCH and the information included in the uplink grant related to the cyclic shift of an uplink reference signal that is time-multiplexed with the PUSCH, HARQ control unit 1013 determines a PHICH corresponding to the HARQ process among a plurality of PHICHs within the downlink subframe. Based on the number (timing) of a downlink subframe from which an uplink grant is detected and the type of the DCI format of the detected uplink grant, HARQ control unit 1013 determines an HARQ process corresponding to the detected uplink grant.

Conversion unit 111 converts the HARQ indicator and the uplink grant input from the reception unit. Conversion unit 111 outputs the converted HARQ indicator and uplink grant to HARQ control unit 1013 in higher-layer processing unit 101. When DCI format 0 is input from reception unit 105, uplink grant division unit 1111 included in conversion unit 111 outputs the input DCI format 0 to HARQ information conversion unit 1113.

When DCI format 4 is input from reception unit 105, uplink grant division unit 1111 divides the input DCI format 4 into an uplink grant for the first HARQ process and an uplink grant for the second HARQ process. Uplink grant division unit 1111 outputs the uplink grant for the first HARQ process to HARQ information conversion unit 1113. Uplink grant division unit 1111 outputs the uplink grant for the second HARQ process to HARQ information conversion unit 1115.

The uplink grant for the first HARQ process includes information included in DCI format 4 other than MCS & RV and NDI for the second HARQ process, such as MCS & RV and NDI for the first HARQ process, and the resource block assignment. The uplink grant for the second HARQ process includes information included in DCI format 4 other than MCS & RV and NDI for the first HARQ process, such as MCS & RV and NDI for the second HARQ process, and the resource block assignment.

Uplink grant division unit 1111 performs the following process when the number of uplink data controlled by the last received uplink grant (for example, DCI format 0) for the HARQ process corresponding to a certain subframe is different from the number of uplink data controlled by the next received uplink grant (for example, DCI format 4). In other words, even if the received DCI format (for example, DCI format 4) instructs retransmission of uplink data, uplink grant division unit 1111 converts the uplink grant instructing the received retransmission into an uplink grant instructing initial transmission. Uplink grant division unit 1111 outputs the uplink grant obtained by this conversion to HARQ information conversion unit 1113 and/or HARQ information conversion unit 1115.

HARQ information conversion unit 1113 included in conversion unit 111 converts the HARQ indicator for the first HARQ process input from reception unit 105 and the uplink grant for the first HARQ process input from uplink grant division unit 1111. HARQ information conversion unit 1113 outputs the converted HARQ indicator for the first HARQ process and/or uplink grant for the first HARQ process to the first HARQ process.

When the input uplink grant for the first HARQ process instructs disabling of uplink data transmission, even if the HARQ indicator is not input or the HARQ indicator indicates ACK, HARQ information conversion unit 1113 outputs only the HARQ indicator indicating NACK to the first HARQ process.

When the input uplink grant for the first HARQ process does not instruct disabling of uplink data transmission or when the uplink grant for the first HARQ process is not input, HARQ information conversion unit 1113 outputs the input HARQ indicator and/or uplink grant for the first HARQ process to the first HARQ process without change. HARQ information conversion unit 1115 included in conversion unit 111 performs the same process as that of HARQ information conversion unit 1113 for the input HARQ indicator and/or uplink grant for the second HARQ process. HARQ information conversion unit 1115 outputs the converted HARQ indicator for the second HARQ process and/or uplink grant for the second HARQ process to the second HARQ process.

Based on the control information from higher-layer processing unit 101, control unit 103 generates a control signal for controlling reception unit 105 and transmission unit 107. Control unit 103 outputs the generated control signal to reception unit 105 and transmission unit 107, thereby controlling reception unit 105 and transmission unit 107. In accordance with the control signal input from control unit 103, reception unit 105 demultiplexes, demodulates and decodes the received signal from base station device 3 through transmission/reception antenna 109. Reception unit 105 outputs the decoded information to higher-layer processing unit 101.

In accordance with the control signal input from control unit 103, reception unit 105 demultiplexes, demodulates and decodes the received signal from base station device 3 through transmission/reception antenna 109. Reception unit 105 outputs the decoded information to higher-layer processing unit 301. Reception unit 105 outputs the HARQ indicator included in the decoded PHICH and/or the uplink grant included in the decoded PDCCH to conversion unit 111. Reception unit 105 outputs downlink control information other than the uplink grant included in the decoded PDCCH and downlink data included in the decoded PDSCH to higher-layer processing unit 101.

In accordance with the control signal input from control unit 103, transmission unit 107 generates an uplink reference signal. Transmission unit 107 codes and modulates the uplink data (transport block) input from higher-layer processing unit 101. Transmission unit 107 multiplexes the PUCCH and PUSCH obtained by this coding and modulation, and the generated uplink reference signal, and then transmits the signal obtained by this multiplexing to base station device 3 through transmission/reception antenna 109.

Figure 7:
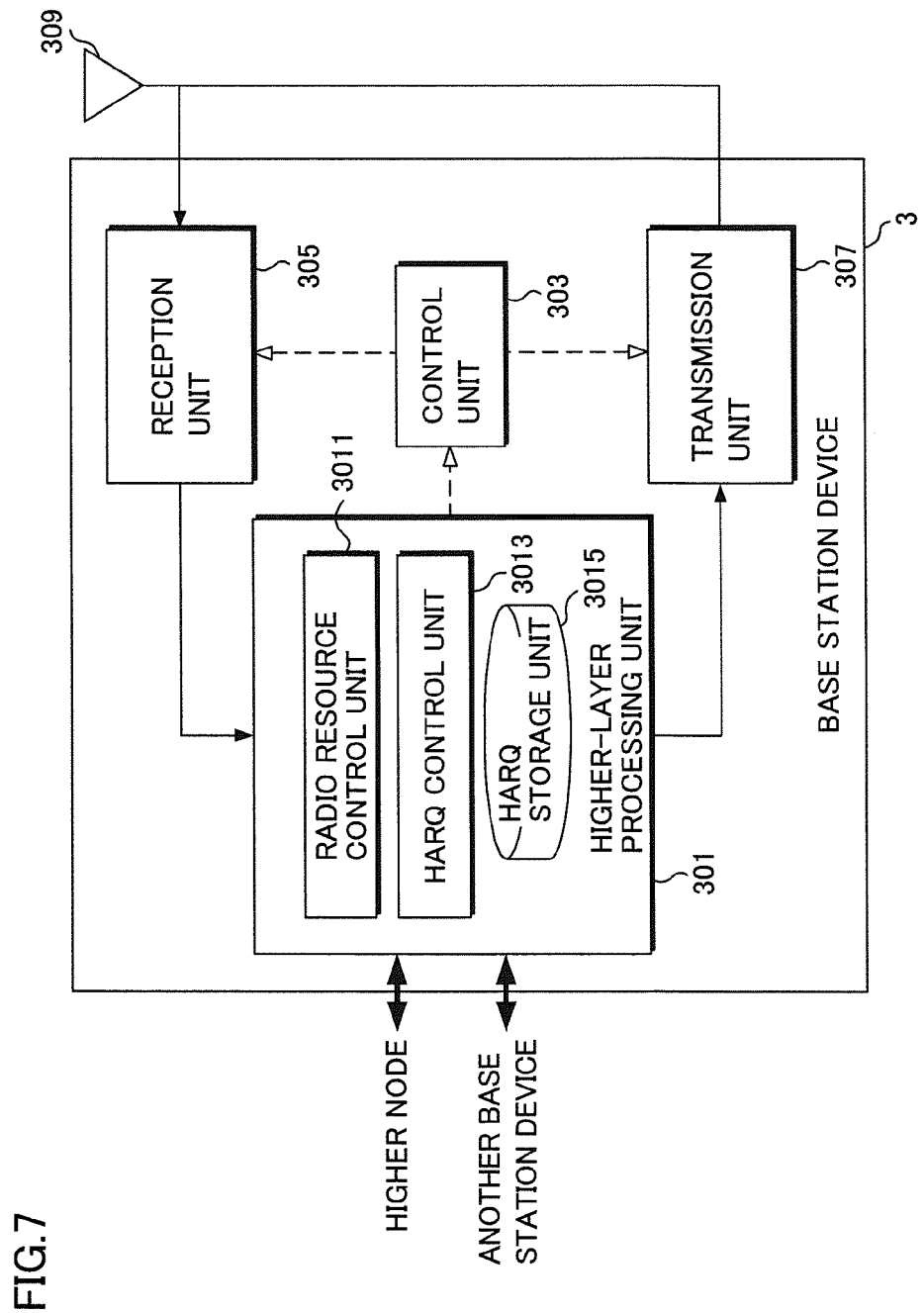
FIG. 7 is a schematic block diagram showing the configuration of a base station device according to the present invention.

FIG. 7 is a schematic block diagram showing the configuration of base station device 3 according to the present invention. Referring to FIG. 7, base station device 3 is configured to include higher-layer processing unit 301, control unit 303, reception unit 305, transmission unit 307, and transmission/reception antenna 309. Furthermore, higher-layer processing unit 301 is configured to include a radio resource control unit 3011, an HARQ control unit 3013 and an HARQ storage unit 3015.

Higher-layer processing unit 301 performs processing with a medium access control (MAC) layer, a packet data convergence protocol (PDCP) layer, a radio link control (RLC) layer, and a radio resource control (RRC) layer. Furthermore, higher-layer processing unit 301 generates control information for controlling reception unit 305 and transmission unit 307. Higher-layer processing unit 301 outputs the generated control information to control unit 303. Radio resource control unit 3011 included in higher-layer processing unit 301 generates downlink data (a transport block), an RRC signal and an MAC CE (Control Element) mapped to the downlink PDSCH. Alternatively, radio resource control unit 3011 obtains downlink data, an RRC signal and an MAC CE mapped to the downlink PDSCH from the higher node. Radio resource control unit 3011 outputs the generated or obtained downlink data, RRC signal and MAC CE mapped to the downlink PDSCH to transmission unit 307. Radio resource control unit 3011 also manages a variety of setting information for each mobile station device 1. For example, radio resource control unit 3011 performs management of the RNTI, including allocation of the C-RNTI to mobile station device 1, and the like.

HARQ control unit 3013 included in higher-layer processing unit 301 manages the uplink HARQ process for each mobile station device 1. HARQ storage unit 3015 included in higher-layer processing unit 301 has a plurality of soft buffers corresponding to their respective uplink HARQ processes managed by HARQ control unit 3013. Since the downlink HARQ process does not relate to the present embodiment, the description thereof will not be given. HARQ control unit 3013 inputs, into a soft buffer, the uplink data (transport block) received on the PUSCH input from reception process unit 305. HARQ control unit 3013 uses an error detecting code (cyclic redundancy check code) added to uplink data, to determine whether uplink data has been successfully decoded or not.

When determining that uplink data has been successfully decoded, HARQ control unit 3013 generates an HARQ indicator indicating ACK. In this case, HARQ control unit 3013 outputs the HARQ indicator indicating the generated ACK to transmission unit 307. When determining that decoding of uplink data has been failed, HARQ control unit 3013 generates an HARQ indicator indicating NACK. In this case, HARQ control unit 3013 outputs the HARQ indicator indicating the generated NACK to transmission unit 307. When determining that decoding of uplink data has been failed, HARQ control unit 3013 changes the information about radio resource allocation as well as a modulation scheme and a coding rate. HARQ control unit 3013 may control transmission unit 307 via control unit 303 so as to transmit the uplink grant that instructs retransmission including the changed information.

When the uplink data retransmitted from mobile station device 1 is input from reception unit 305, HARQ control unit 3013 combines the uplink data stored in the soft buffer and the retransmitted uplink data. Based on the result of this combine, HARQ control unit 3013 determines whether the uplink data has been successfully decoded or not. HARQ control unit 3013 associates the number (timing) of the uplink subframe used by mobile station device 1 for transmitting the PUSCH, with the number of the HARQ process.

For a certain HARQ process, HARQ control unit 3013 determines a PHICH used for transmitting the ACK/NACK corresponding to this HARQ process among a plurality of PHICHs, based on the allocation of the physical resource blocks for PUSCH and the information included in the uplink grant related to the cyclic shift of an uplink reference signal that is time-multiplexed with the PUSCH.

Based on the control information from higher-layer processing unit 301, control unit 303 generates a control signal for controlling reception unit 305 and transmission unit 307. Control unit 303 outputs the generated control signal to reception unit 305 and transmission unit 307, thereby controlling reception unit 305 and transmission unit 307.

In accordance with the control signal input from control unit 303, reception unit 305 demultiplexes, demodulates and decodes the received signal (PUCCH and PUSCH) from mobile station device 1 through transmission/reception antenna 309. Reception unit 305 outputs the decoded information to higher-layer processing unit 301. Transmission unit 307 generates a downlink reference signal in accordance with the control signal input from control unit 303. Transmission unit 307 codes and modulates the HARQ indicator, the downlink control information and the downlink data that are input from higher-layer processing unit 301. Transmission unit 307 multiplexes the PHICH, PDCCH and PDSCH obtained by this coding and modulation, and the downlink reference signal, and transmits the signal obtained by this multiplexing to mobile station device 1 through transmission/reception antenna 309.

In this way, according to the present embodiment, when the uplink grant instructing disabling of uplink data transmission is received, even if the HARQ indicator indicating NACK is received, this uplink data transmission is disabled and ACK is set in the HARQ process corresponding to the uplink data. Accordingly, this uplink data transmission can be stopped with reliability.

Furthermore, according the present embodiment, when the number of uplink data controlled by the last received uplink grant (for example, DCI format 0) is different from the number of uplink data controlled by the next received uplink grant (for example, DCI format 4), initial transmission of uplink data is performed even if the received uplink grant instructs retransmission. Consequently, in the first HARQ process and the second HARQ process corresponding to a single subframe, uplink data is transmitted in accordance with different uplink grants, and thereby, it becomes possible to avoid transmission of different uplink data simultaneously using different radio resources.

A program running on base station device 3 and mobile station device 1 involved in the present embodiment may be a program controlling a CPU (Central Processing Unit) or the like (a program causing a computer to function) so that the functions of the above-described embodiment are implemented. Then, the information handled with these devices is temporarily accumulated in RAM (Random Access Memory) at the time of a process of the information concerned. Then, the information temporarily accumulated in the RAM is stored in various ROMs such as a Flash ROM (Read Only Memory) or an HDD (Hard Disk Drive). Then, the information stored in various ROMs or the HDD is read, and modified or written by the CPU as required.

Mobile station device 1 and a part of base station device 3 in the above-described embodiment may be implemented by a computer. In this case, a program for implementing the control function may be recorded on a computer-readable recording medium, and the program recorded on this recording medium may be read and executed by a computer system so as to implement it. "Computer system" herein refers to a computer system integrated in mobile station device 1 or base station device 3 and includes an OS (Operating System) and hardware such as peripherals.

A "computer-readable recording medium" refers to portable media such as flexible disk, magneto-optical disk, ROM, and CD-ROM, as well as storage device such as hard disk integrated in a computer system. Moreover, a "computer-readable recording medium" may also include (i) those dynamically holding a program for a short period of time, like communication lines used in the case where a program is transmitted through a network such as Internet or a communication line such as telephone line, and (ii) those holding the program for a certain period of time, like a volatile memory in a server or a computer system functioning as a client in the aforementioned case. The program above may also be used for implementing a part of the above-described functions. The program above may also be the one that enables the above-described functions to be implemented in combination with a program having already been recorded in the computer system.

Mobile station device 1 and base station device 3 in the embodiment described above may partially or wholly be implemented typically in the form of an LSI which is an integrated circuit. The functional blocks of mobile station device 1 and base station device 3 may individually be configured in the form of a chip, or may partially or wholly be integrated into a chip. The integrated circuit may be implemented not only in the form of an LSI but a dedicated circuit or general-purpose processor. If the advanced semiconductor technology provides any technology for implementing an integrated circuit that replaces the LSI, an integrated circuit provided by this technology may also be used.

While one embodiment of the present invention has been described in detail with reference to the drawings, specific features are not limited to the above-described ones and various design changes and the like may be made within the scope without going beyond the substance of the invention.

REFERENCE SIGNS LIST 1, 1A, 1B, 1C mobile station device, 3 base station device, 101 higher-layer processing unit, 1011 radio resource control unit, 1013 HARQ control unit, 1015 HARQ storage unit, 103 control unit, 105 reception unit, 107 transmission unit, 111 conversion unit, 1111 uplink grant division unit, 1113 HARQ information conversion unit, 1115 HARQ information conversion unit, 301 higher-layer processing unit, 3011 radio resource control unit, 3013 HARQ control unit, 3015 HARQ storage unit, 303 control unit, 305 reception unit, 307 transmission unit.

The invention claimed is:
1. A mobile station device comprising:
transmission circuitry configured to programmed to, or configured and programmed to transmit a transport block in an uplink subframe; and higher layer processing circuitry configured to, programmed to, or configured and programmed to maintain at least a Hybrid Automatic Repeat reQuest (HARQ) process, wherein
in a case that the transport block has been transmitted by the mobile station device to a base station device and the transport block is disabled based on a physical downlink control channel received in a downlink subframe, acknowledgement (ACK) for the transport block is set as HARQ feedback related to the HARQ process.

2. A radio communication method for a mobile station device, the radio communication method comprising:
transmitting a transport block in an uplink subframe;
maintaining at least a Hybrid Automatic Repeat reQuest (HARQ) process; and
in a case that the transport block has been transmitted by the mobile station device to a base station device and the transport block is disabled based on a physical downlink control channel received in a downlink subframe, setting acknowledgement (ACK) for the transport block as HARQ feedback related to the HARQ process.

3. An integrated circuit mountable on a mobile station device, the integrated circuit comprising:
transmission circuitry configured to, programmed to, or configured and programmed to transmit a transport block in an uplink subframe; and
higher layer processing circuitry configured to, programmed to, or configured and programmed to maintain at least a Hybrid Automatic Repeat reQuest (HARQ) process, wherein
in a case that the transport block has been transmitted by the mobile station device to a base station device and the transport block is disabled based on a physical downlink control channel received in a downlink subframe, acknowledgement (ACK) for the transport block is set as HARQ feedback related to the HARQ process.

* * * * *